UNITED STATES PATENT OFFICE 2,491,566

AZO-DYESTUFFS

Otto Kaiser, Dornach, and Raymond Gunst, Basel, Switzerland, assignors to Ciba Limited, Basel, Switzerland, a Swiss firm No Drawing. Application August 28, 1947, Serial No. 771,138. In Switzerland September 11, 1946

12 Claims. (Cl. 260—175)

In U. S. Patents Nos. 1,594,828 and 1,782,682 are described asymmetrical urea derivatives of monoazo-dyestuffs which dye cellulose fibers yellow tints. These dyestuffs are made by treating, for example, a solution of equivalent quantities of 4-amino-5-methoxy - 2:2'-dimethyl-1:1'-azobenzene-5'-sulfonic acid and 4-amino-4'-hydroxy-1:1'-azobenzene-3'-carboxylic acid with phosgene. The dyestuffs so obtained possess a good affinity for cellulose fibers, but have the disadvantage that they cannot be discharged pure white under alkaline conditions.

The present invention is based on the observation that valuable asymmetrical urea derivatives, which correspond to the formula

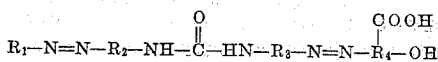

in which $R_1$ represents a naphthalene radical which is attached to the azo-group in an α-position and contains at least one sulfonic acid group, but otherwise is free from auxochromic groups, —$R_2$—NH— represents the radical of an amine of the benzene or naphthalene series coupled in para-position with respect to the amino-group, and

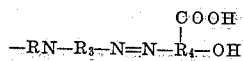

represents the radical of a 4-amino-4'-hydroxy-1:1'-azobenzene-3'-carboxylic acid, are obtained by treating with phosgene monoazo-dyestuffs of the formulae

and

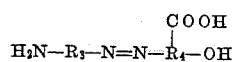

in which $R_1$, $R_2$, $R_3$ and $R_4$ have the meanings given above, and so selecting the starting materials that the resulting urea derivative contains at least two sulfonic acid groups.

The monoazo-dyestuffs of the general formula

used as starting materials are advantageously obtained by diazotizing an α-naphthylamine sulfonic acid and coupling the resulting diazo-compound with an amine capable of coupling in the para-position, that is to say, a so-called middle component, the coupling being advantageously conducted in an acid medium, for example, a medium rendered acid with acetic acid. As diazo- components in this connection there come into consideration α-naphthylamine monosulfonic acids such, for example, as 1-amino-naphthalene-3-, -4-, -5-, -6- or -7-sulfonic acid, but more especially α-naphthylamine disulfonic acids such, for example, as 1-aminonaphthalene-3:6-disulfonic acid, 1-aminonaphthalene-3:7-disulfonic acid, 1-aminonaphthalene-4:7-disulfonic acid or 1-aminonaphthalene-5:7-disulfonic acid. The arylamines to be used as coupling components and capable of coupling in para-position to the amino group may belong, for example, to the naphthalene series, but advantageously to the benzene series. As examples of such compounds there may be mentioned: 1-amino-2-methoxy-5-methylbenzene, 1-amino-2-ethoxy-5-methylbenzene, 1-amino - 3 - methylbenzene, 1-amino-3-methoxybenzene, 1 - amino-2:5-dimethoxybenzene, 1-amino-2:5-diethoxybenzene, 1-amino-2-ethoxy-5-methoxybenzene; and as examples of compounds of the naphthalene series: 1-aminonaphthalene-6-sulfonic acid, 1-aminonaphthalene-7-sulfonic acid or a mixture of these two compounds, and advantageously 1-aminonaphthalene.

The 4-amino-4'-hydroxy-1:1'-azobenzene-3'-carboxylic acids also to be used as starting materials may contain further substituents of the kind usually present in azo-dyestuffs, such as halogen atoms, especially chlorine atoms, alkyl groups, especially methyl groups, and sulfonic acid groups. Such products are in part generally known, for example, 4-amino-4'-hydroxy-1:1'-azobenzene-3'-carboxylic acid itself (see, for example, Beilstein, 4th edition, vol. 16, page 329) and also 4-amino-4'-hydroxy-3'-carboxy-1:1'-azobenzene-5'-sulfonic acid which may be used as a starting material (see Swiss Patent No. 243,602), or they can be made by methods in themselves known.

The linking of one molecular proportion of each of the two monoazo-dyestuffs to form the asymmetrical urea derivative is advantageously conducted at a slightly raised temperature in alkaline solution, advantageously in a solution rendered alkaline with an alkali carbonate.

The dyestuffs obtainable by the present invention have a good affinity for vegetable fibers, and are therefore suitable for dyeing or printing cellulosic materials such as linen, cotton and artificial silk or staple fibers of regenerated cellulose. In this manner there are obtained principally yellow to yellow-orange tints, which can generally be discharged pure white by the neutral or alkaline discharge printing process.

Especially valuable are those urea derivatives obtainable by the present invention which correspond to the formula

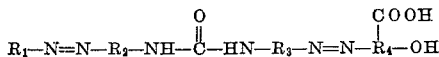

in which the radical $R_1$ contains two sulfonic acid groups and the radicals $R_2$, $R_3$ and $R_4$ are free from sulfonic acid groups.

If desired the dyestuffs may be treated in substance, on the fiber or in the dyebath with an agent yielding metal, for example, chromium, nickel, cobalt, manganese or iron and especially an agent yielding copper. Metallization in substance may be carried out in an alkaline, neutral or acid medium with or without the use of an addition favouring the formation of the complex or enhancing solubility. In many cases the treatment with an agent yielding metal, especially an agent yielding copper, is carried out with advantage on the fiber or in a single-bath process in part in the dyebath and in part on the fiber, for example, in the manner described in U. S. Patent 2,148,659.

The following examples illustrate the invention, the parts being by weight:

Example 1

45.1 parts of the aminoazo-dyestuff, obtained by coupling diazotized 1-aminonaphthalene-3:6-disulfonic acid with 1 - amino - 2 - methoxy - 5-methylbenzene, are dissolved together with 25.7 parts of 4-amino-4'-hydroxy-1:1'-azobenzene-3'-carboxylic acid in 4000 parts of water with the addition of sodium carbonate until a distinctly alkaline reaction is obtained, and the whole is treated, while stirring, at 30–35° C. with phosgene until free $NH_2$-groups can no longer be detected. The resulting urea derivative of the formula

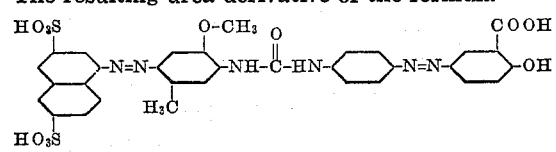

is precipitated in the form of its sodium salt by means of sodium chloride, separated by filtration, and dried. It is a red-brown powder, which dissolves in water with a yellow coloration and dyes cotton orange-yellow tints. The dyeings are distinguished by their good capacity for being discharged under neutral and alkaline conditions.

By using in this example, instead of 1-amino-2-methoxy-5-methylbenzene, 1-amino-2-ethoxy-5-methylbenzene, and correspondingly using 46.5 parts of the aminoazo-dyestuff obtained by coupling diazotized 1-aminonaphthalene-3:6-disulfonic acid with 1-amino-2-ethoxy-5-methylbenzene, and in other respects following the procedure described above, there is obtained a dyestuff having very similar properties, which yields on cotton somewhat more reddish tints.

A dyestuff having similar properties is also obtained by treating with phosgene 45.1 parts of the aminoazo-dyestuff obtained by coupling diazotized 1-aminonaphthalene-3:6-disulfonic acid with 1-amino-2-methoxy-5-methylbenzene and 33.7 parts of 4-amino-4'-hydroxy-1:1'-azobenzene-3'-carboxylic acid-5'-sulfonic acid by the procedure described above.

Example 2

45.1 parts of the amonoazo-dyestuff, obtained by coupling diazotized 1-aminonaphthalene-4:7-disulfonic acid with 1 - amino - 2 - methoxy - 5-methylbenzene, are dissolved with 25.7 parts of 4-amino - 4' - hydroxy - 1:1' - azobenzene-3'-carboxylic acid in 4000 parts of water with the addition of sodium carbonate until the reaction is distinctly alkaline, and the whole is treated while stirring with phosgene at 30–35° C. until $NH_2$-groups can no longer be detected. The resulting urea derivative of the formula

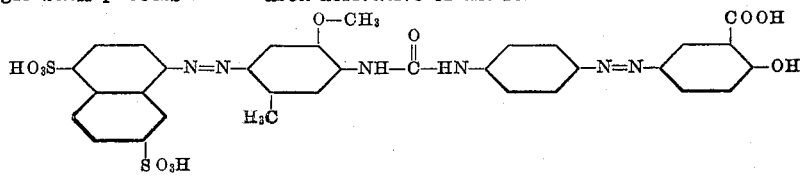

is precipitated in the form of its sodium salt by means of sodium chloride, separated by filtration, and dried. It is a red-brown powder, which dissolves in water with a yellow coloration and dyes cotton orange-yellow tints. The dyeings are characterized by a good capacity for being discharged under neutral and alkaline conditions.

By using in this example, instead of 1-amino-2-methoxy - 5 - methylbenzene, 1-amino-3-methylbenzene, and correspondingly using 42.1 parts of the aminoazo-dyestuff obtained by coupling diazotized 1 - amino - naphthalene - 4:7-disulfonic acid with 1-amino-3-methylbenzene, and in other respects following the procedure described above, there is obtained a dyestuff having similar properties which dyes cotton more yellow tints.

Example 3

45.7 parts of the amino-azo-dyestuff, obtained by coupling diazotized 1-aminonaphthalene-4:7-disulfonic acid with 1-aminonaphthalene, are dissolved with 25.7 parts of 4-amino-4'-hydroxy-1:1'-azobenzene-3'-carboxylic acid in 4000 parts of water with the addition of sodium carbonate until the reaction is distinctly alkaline, and the whole is treated with phosgene, while stirring at 30–35° C. until $NH_2$-groups can no longer be detected. The resulting urea derivative of the formula

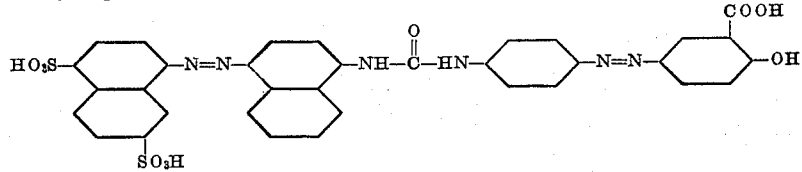

is precipitated in the form of its sodium salt with the aid of sodium chloride, separated by filtration, and dried. It is a red-brown powder, which dissolves in water with a yellow coloration and dyes cotton orange-yellow tints. The dyeings are distinguished by their good capacity for being discharged under neutral and alkaline conditions.

Example 4

A dyebath is prepared with 1.2 parts of the dyestuff obtainable as described in the first paragraph of Example 1, 2 parts of sodium carbonate and 2500 parts of water. 100 parts of cotton sateen are entered at 60° C. and the bath is heated to 90–95° C. After ¼ hour 30 parts of crystalline sodium sulfate are added, and the whole is boiled for a further ½ hour. The dyestuff is dyed a fast orange-yellow tint.

Pure white discharge prints can be produced on the cotton sateen so dyed by means of the alkaline discharge printing paste of the following composition:

| | Parts |
|---|---|
| Sodium formaldehyde sulfoxylate | 200 |
| Water | 120 |
| British gum thickening, 1:1 | 550 |
| Potassium carbonate | 80 |
| Glycerine | 50 |
| | 1000 |

What we claim is:

1. An azo-dyestuff containing at least two sulfonic acid groups and corresponding to the general formula

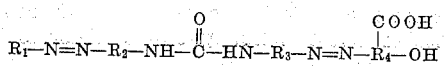

in which $R_1$ stands for a naphthalene radical attached to the azo group in an α-position and containing at least one sulfonic acid group but being otherwise free from auxochromic groups, —$R_2$—NH— stands for the radical of an aromatic amine selected from the group consisting of amines of the benzene and naphthalene series and coupled in para-position with respect to the amino group, and

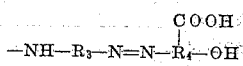

stands for the radical of a 4-amino-4'-hydroxy-1:1'-azobenzene-3'-carboxylic acid.

2. An azo-dyestuff corresponding to the general formula

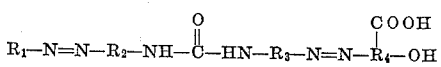

in which $R_1$ stands for a naphthalene radical attached to the azo group in an α-position and containing two sulfonic acid groups but being otherwise free from auxochromic groups, —$R_2$—NH— stands for the radical of an aromatic amine of the naphthalene series coupled in para-position with respect to the amino group, and

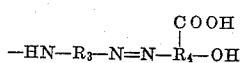

stands for the radical of a 4-amino-4'-hydroxy-1:1'-azobenzene-3'-carboxylic acid.

3. An azo-dyestuff corresponding to the general formula

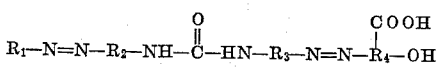

in which $R_1$ stands for a naphthalene radical attached to the azo group in an α-position and containing two sulfonic acid groups but being otherwise free from auxochromic groups, —$R_2$—NH— stands for the radical of an aromatic amine of the naphthalene series coupled in para-position with respect to the amino group, and

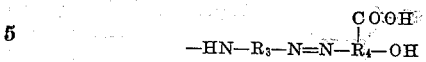

stands for the radical of a 4-amino-4'-hydroxy-1:1'-azobenzene-3'-carboxylic acid which is free from sulfonic acid groups.

4. An azo-dyestuff corresponding to the general formula

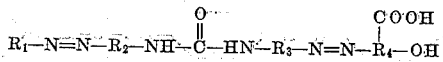

in which $R_1$ stands for a naphthalene radical attached to the azo group in an α-position and containing two sulfonic acid groups but being otherwise free from auxochromic groups,

stands for the radical of an amine of the benzene series being free from sulfonic acid groups and coupled in para-position with respect to the amino group, and

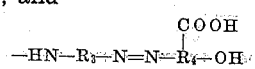

stands for the radical of a 4-amino-4'-hydroxy-1:1'-azobenzene-3'-carboxylic acid which is free from sulfonic acid groups.

5. An azo-dyestuff corresponding to the general formula

in which $R_1$ stands for a naphthalene radical attached to the azo group in an α-position and containing two sulfonic acid groups but being free from auxochromic groups, and —$R_2$—NH— stands for the radical of an amine of the benzene series being free from sulfonic acid groups and coupled in para-position with respect to the amino group.

6. An azo-dyestuff corresponding to the general formula

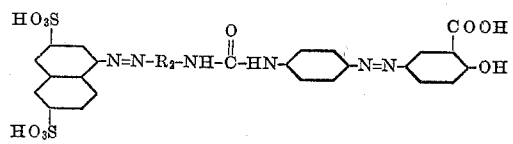

in which —$R_2$—NH— stands for the radical of an amine of the benzene series being free from sulfonic acid groups and coupled in para-position with respect to the amino group.

7. An azo-dyestuff corresponding to the general formula

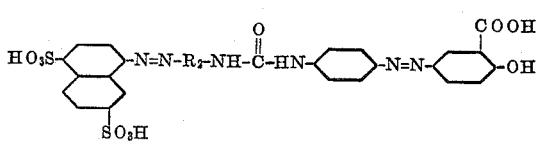

in which —$R_2$NH— stands for the radical of an amine of the benzene series being free from sulfonic acid groups and coupled in para-position with respect to the amino group.

8. The azo-dyestuff of the formula

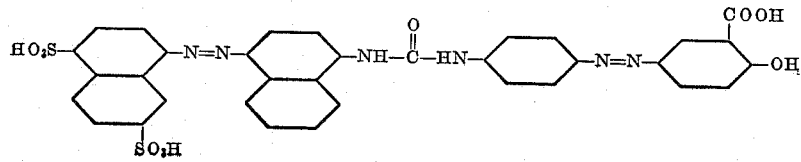

9. The azo-dyestuff of the formula

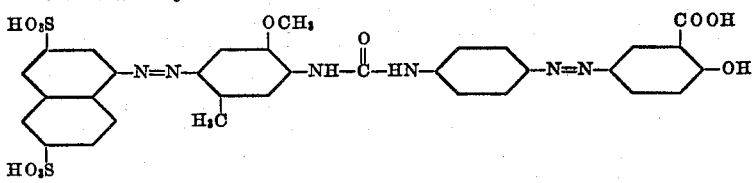

10. The azo-dyestuff of the formula

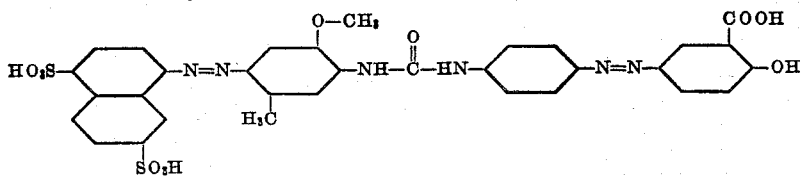

11. An azo-dyestuff corresponding to the general formula

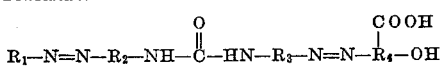

in which $R_1$ stands for a naphthalene radical attached to the azo group in an α-position and containing two sulfonic acid groups but being otherwise free from auxo-chromic groups, —$R_2$—NH— stands for the radical of an aromatic amine of the benzene series coupled in para-position with respect to the amino group, and

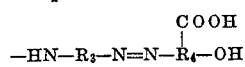

stands for the radical of a 4-amino-4'-hydroxy-1:1'-azobenzene-3'-carboxylic acid.

12. An azo-dyestuff corresponding to the general formula

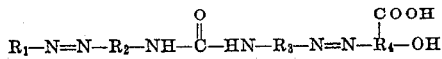

in which $R_1$ stands for a naphthalene radical attached to the azo group in an α-position and containing two sulfonic acid groups but being otherwise free from auxo-chromic groups, —$R_2$—NH— stands for the radical of an aromatic amine of the benzene series coupled in para-position with respect to the amino group, and

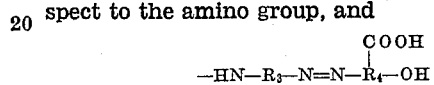

stands for the radical of a 4-amino-4'-hydroxy-1:1'-azobenzene-3'-carboxylic acid which is free from sulfonic acid groups.

OTTO KAISER.
RAYMOND GUNST.

REFERENCES CITED

The following references are of record in the file of this patent:

UNITED STATES PATENTS

| Number | Name | Date |
|---|---|---|
| 1,594,828 | Geller | Aug. 3, 1926 |
| 1,782,682 | Geller | Nov. 25, 1930 |
| 1,846,546 | Montmollin | Feb. 23, 1932 |

FOREIGN PATENTS

| Number | Country | Date |
|---|---|---|
| 5,383 | Great Britain | 1909 |